United States Patent [19]

Kusaka

[11] Patent Number: 4,462,096

[45] Date of Patent: Jul. 24, 1984

[54] PICKUP ASSEMBLY FOR DISC PLAYER

[75] Inventor: Satoshi Kusaka, Tokyo, Japan

[73] Assignee: Sony Corporation, Tokyo, Japan

[21] Appl. No.: 314,738

[22] Filed: Oct. 23, 1981

[30] Foreign Application Priority Data

Oct. 24, 1980 [JP] Japan .................. 55-149530
Oct. 31, 1980 [JP] Japan .................. 55-153984

[51] Int. Cl.³ .............................................. G11B 7/12
[52] U.S. Cl. ..................................... 369/45; 350/252; 250/201
[58] Field of Search ............... 369/45, 44, 111, 112; 350/255, 252; 250/201

[56] References Cited

U.S. PATENT DOCUMENTS

| | | | |
|---|---|---|---|
| 4,092,529 | 5/1978 | Aihara | 369/45 |
| 4,110,008 | 8/1978 | Uesugi | 350/255 |
| 4,135,206 | 1/1979 | Kleuters | 369/44 |
| 4,302,830 | 11/1981 | Homooka | 369/44 |
| 4,321,701 | 3/1982 | Kusaka | 369/45 |

FOREIGN PATENT DOCUMENTS 26109 4/1981 European Pat. Off. .............. 369/45
56-119944 9/1981 Japan ................................... 369/45

*Primary Examiner*—Alan Faber
*Attorney, Agent, or Firm*—Hill, Van Santen, Steadman & Simpson

[57] ABSTRACT

A pickup assembly for a disc player includes a magnetic circuit for generating magnetic fluxes perpendicular to each other, a first coil group through which a current flows in a direction perpendicular to the magnetic fluxes, a second coil group through which a current flows in a direction perpendicular to one of the magnetic fluxes, a third coil group through which a current flows in a direction perpendicular to the other of the magnetic fluxes, a bobbin on which the first, second and third coil groups are wound, and a supporting member for supporting the bobbin so as to be movable in the three ways as along X-, Y- and Z axes.

11 Claims, 15 Drawing Figures

PICKUP ASSEMBLY FOR DISC PLAYER

BACKGROUND OF THE INVENTION

1. Field of the Invention

This invention relates to a pickup assembly for use in an apparatus for reading optically an information recorded on a disc as a track or tracks.

2. Description of the Prior Art

A disc is known on which digitalized informations such as video signals or audio signals are recorded along a spiral track in the form of pits. The length of the pit and the distance between the pits vary with the content of the information. In a disc player for reproducing the disc, for example, an optical contactless pickup is used for detecting the informations. The pickup radiates laser on to the surface of the disc, and receives the reflected laser from the surface of the disc at its light-sensing element. The reflected laser is modulated due to diffraction phenomenon by the pits. The pickup is attached to a pickup arm which is lenearly moved or rotatably supported. In the reproducing operation, the pickup is moved towards the center of the disc in the radial direction, or moved outwards from the center of the disc, facing to the disc, so that the spiral track is traced by the pickup.

In the disc player with the contactless pickup, there are made a tracking error of the pickup, a time base error and a focus error during the reproducing operation due to eccentricity of the disc, warp thereof and external vibration. In the pickup, an optical system is so arranged as to be movable in the X-axis, Y-axis and Z-axis and to control the radiation position of the laser and the focus point thereof for correcting the errors. A movable member in the optical system is moved in the radial direction of the disc, namely along the X-axis, so as to correct the tracking error. It is moved in the normal direction to the disc, namely along the Z-axis, so as to correct the focus error. And it is moved in the direction of the track formed on the disc, namely along the Y-axis, so as to correct the time base error.

The U.S. Pat. No. 4,092,529 discloses a method to move the movable member along the X-axis, Y-axis and Z-axis. In the method, a comination of coil and magnet is used. Coils are wrapped on a tube including optical system, and magnets are so arranged as to intersect with the coils. An error signal current is supplied to the coils to move the entire tube and control the optical path, so that the tracking error and the time base error are corrected. Further, a cylindrical member is arranged on the tube, and a coil is wrapped on the cylindrical member, facing to a magnet. An error signal current is supplied to the coil to drive the tube up and down, so that the focus error is corrected. In such a device, the movable member is constituted by many parts. Accordingly, the device is complicated in construction, and heavy. Although the errors should be corrected at high speed, the movable member as a servo system is inferior in response. Further, the movable member has a proper resonant frequency. Accordingly, when the frequency of the movement of the movable member by the servo signal coincide with its resonant frequency, the servo function is lost.

SUMMARY OF THE INVENTION

An object of this invention is to provide a novel pickup assembly for a disc player which can solve the above described problems.

Another object of this invention is to provide a pickup assembly for a disc player in which plural coils are symmetrically arranged with respect to the axis of a cylindrical member having an optical system so as to balance the total mass of the movable member, and thereby the latter can be smoothly driven and moved.

A further object of this invention is to provide a pickup assembly for a disc player in which the movable member can be moved in the X-, Y- and Z directions to correct the tracking error, the time base error and focussing error by such a simple electro-magnetic arrangement that plural coils are symmetrically arranged with respect to the axis of a cylindrical member having an optical system, and other coils and magnets are arranged in the direction perpendicular to the axis of the cylindrical member.

A still further object of this invention is to provide a pickup assembly for a disc player in which the density of the magnetic flux to be supplied to the coils is increased to efficiently drive the movable member.

A still further object of this invention is to provide a pickup assembly for a disc player in which the movable member is supported by a spring member such as leaf spring or foaming urethane and thereby it can be smoothly moved.

A still further object of this invention is to provide a pickup assembly for a disc player in which a pair of coils are arranged, one of which functions to correct one of the tracking, time base and focussing errors, and another of which functions to detect the movement of the movable member thereby to brake the latter for preventing the resonant vibration.

A still further object of this invention is to provide a pickup assembly for a disc player in which a coil for driving a cylindrical member having an optical system and another coil for detecting the drive of the coil are arranged on the cylindrical member, thereby an undesirable vibration of the member can be eliminated by the detecting output of the other coil, and the member is braked by the coil directly attached to the member, the total mass of the movable member balancing with respect to the axis of the member, and thereby the movable member can be accurately moved on driving.

In accordance with an aspect of this invention, a pickup assembly for a disc player includes (A) a tube-like movable member having an optical system; (B) a first coil group wound on the movable member in the direction normal to the axis of the movable member; (C) second and third coil groups arranged on the movable member, perpendicular to the first coil group in the space relationship of angle 90° to each other, the second and third coil groups including a pair of coils, respectively; and (d) a magnetic circuit for supplying magnetic fluxes to the first, second and third coil groups, the magnetic circuit including magnetic poles being arranged in the space relationship of angle 90° to each other so as to face to the second and third coil groups respectively, and the movable member being so supported by a spring member as to align the adjoining portions of the paired coils of the second and third coil groups substantially with the center of the magnetic poles respectively.

Other objects, features and advantages according to the present invention will become apparent during the course of the description which follows.

DESCRIPTION OF THE PREFERRED EMBODIMENTS

Figure 1:
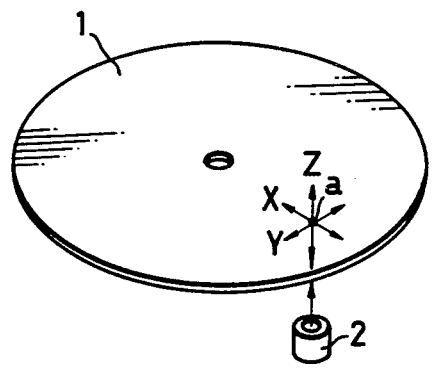
FIG. 1 is a view illustrating the principle of a disc reading apparatus, showing the relationship between an optical disc and a pickup assembly.

FIG. 1 shows a view illustrating the concept of a pickup assembly for a disc player according to this invention. In FIG. 1, an optical disc 1 is rotated by an electric motor. Informations such as audio signals or video signals, or audio signals and video signals are recorded on the optical disc 1 in the form of pits. Laser light is radiated onto the surface of the optical disc 1, and the radiation position is controlled to read out the informations. A movable member 2 of a pickup assembly including optical system is so arranged as to be movable in the X-, Y- and Z-axis directions for controlling the radiation position of the laser light or the signal detecting point a. The movable member 2 or the detecting point a is moved in the X-axis direction to correct the tracking error. It is moved in the Y-axis direction to correct the time base error. And it is moved in the Z-axis direction to correct the focus error.

Figure 2:
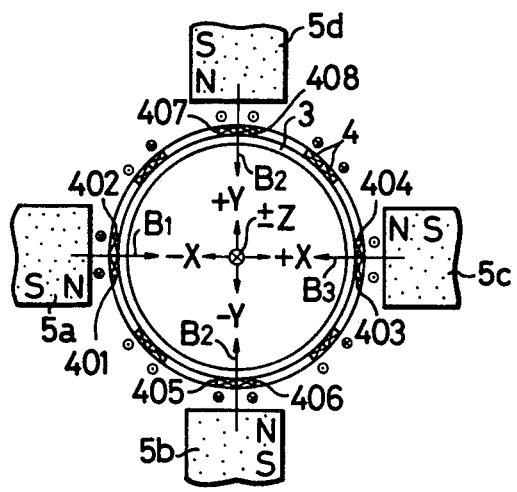
FIG. 2 is a plan view of a magnetic circuit portion, showing the principle of a pickup assembly for a disc player of this invention.

FIG. 2 shows the principle of the pickup assembly. In FIG. 2, eight coils 401 to 408 are arranged arround a a coil 3, close to each other, and perpendicular to the coil 3. Four permanent magnets 5a to 5d are arranged at the angular intervals of 90° arround the coils 3 and 401 to 408 which are mounted on the movable member 2 of the pickup. Thus, the movable member 2 can be controlled to be moved in the three axises directions as described hereinafter.

Figure 3:
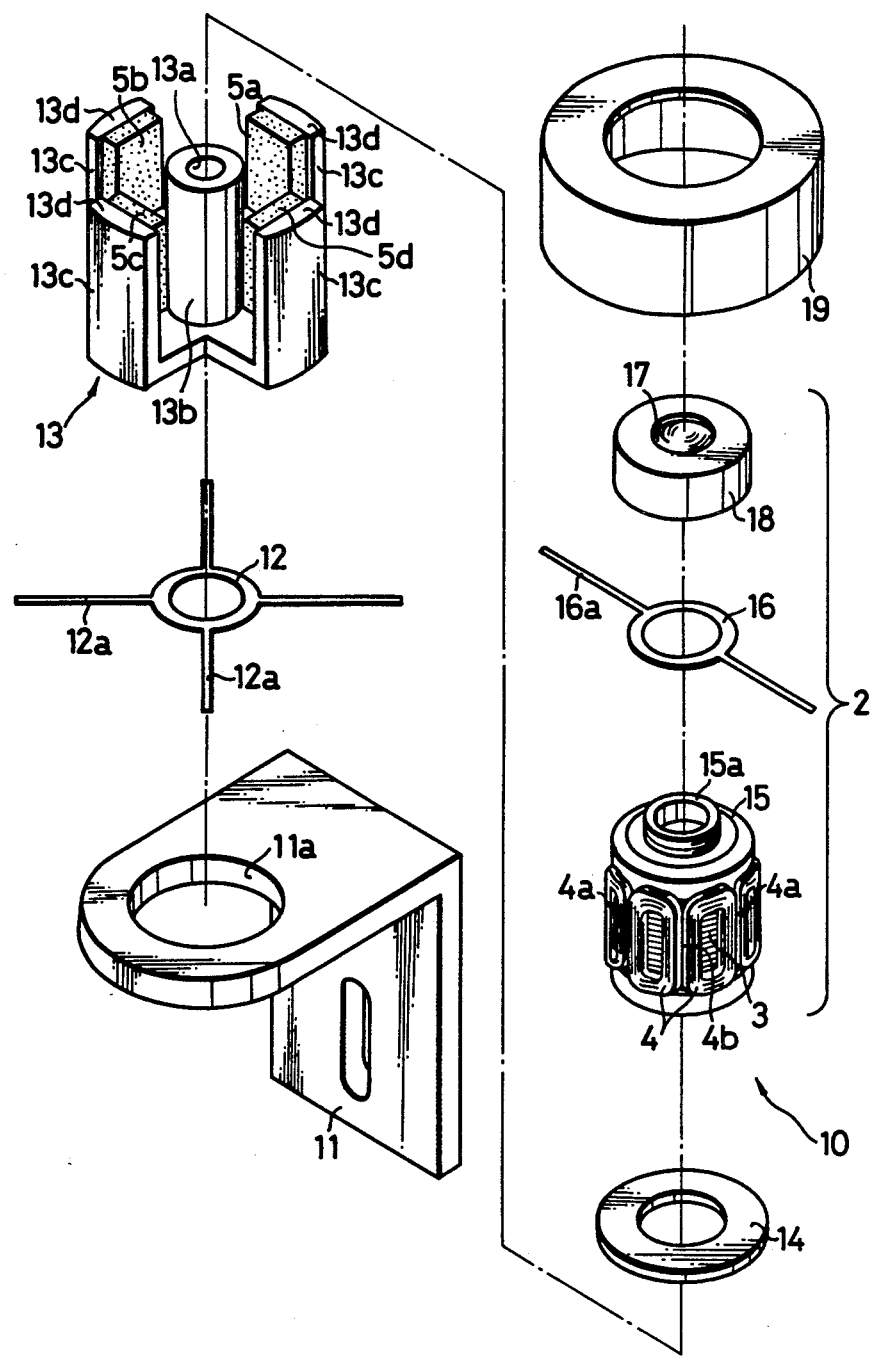
FIG. 3 is an exploded perspective view of a pickup assembly for a disc player according to a first embodiment of this invention.

FIG. 3 to FIG. 6 show a first embodiment of this invention to which the above described principle is applied. A pickup assembly 10, as shown in FIG. 3, includes a base 11, a leaf spring 12 for supporting the movable member, a yoke 13 to which permanent magnets 5a to 5d are attached, a support ring 14, a bobbin 15 on which coils 3 and 4 are mounted, another leaf spring 16 for supporting the movable member, a lens holder 17 holding a lens 17, and a cap 19.

The base 11 is mounted, although not shown, on a linearly movable or rotatable pickup arm. A hole 11a is made in the base 11. Laser beam passes through the hole 11a. The leaf spring 12 is thin, and made of phosphor bronze. Four arms 12a are made at the angular intervals of 90° in the leaf spring 12. The yoke 13 consists of a cylindrical portion 13b having a through hole 13a, and four projecting portions 13c which are formed at the angular intervals of 90° arround the cylindrical portion 13b and and integrally with the latter. Four permanent magnets 5a, 5b, 5c and 5d are attached to the projecting protions 13c with adhesive.

A small diameter portion 12a is formed in the bobbin 15. The coil 3 of a predetermined turn number is coaxially wound on the circumferential surface of the bobbin 15. The eight elliptic coils 4 of a predetermined turn number are attached onto the circumferential surface of the coil 3 with adhesive. The lengthwise directions of the coils 4 are perpendicular to the coil 3. The coils 4 contact with each other at adjoining portions 4a and 4b. The other leaf spring 16 is thin, and made of phosphor bronze. Two arms 16a are made diametrically in the other leaf spring 16. The numbers of the arms 16a and 12a of the leaf springs 16 and 12 are not limited to two and four, respectively.

The above described parts are assembled in the following manner.

First, the yoke 13 and the leaf spring 12 are attached to the base 11 with adhesive. The arms 12a of the leaf spring 12 are projected between the projecting portings 13c of the yoke 13. A recess for fitting the leaf spring 12 may be formed in the bottom surface of the yoke 13.

Figure 5:
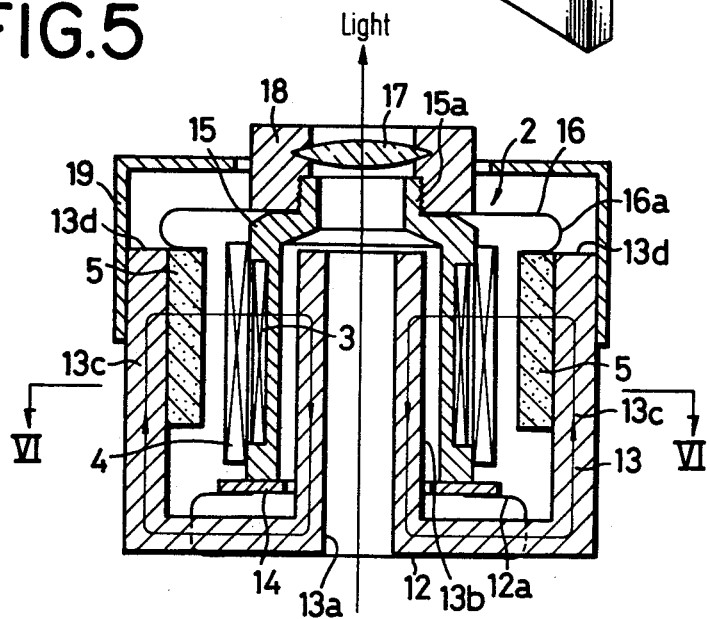
FIG. 5 is an enlarged cross-sectional view of the pickup assembly of FIG. 4.

The top and portions of the arms 12a of the leaf spring 12 are upwardly bent by 180°, as shown in FIG. 5. The ring 14 is attached to the bent top end portions 12a with adhesive. Then, the bobbin 15 is attached to the ring 14 with adhesive. The cylindrical portion 13b of the yoke 13 is loosely fitted into the bobbin 15. The other leaf spring 16 is fitted to the small diameter portion 15a of the bobbin 15, and fixed to the latter by adhesive. The lens holder 18 is screwed to the small diameter portion 15a. It may be fixed to the small diameter portion 15a with adhesive or by an elastic fitting method. The arms 16a are not aligned with the arms 12a, but shifted from the latter.

Figure 4:
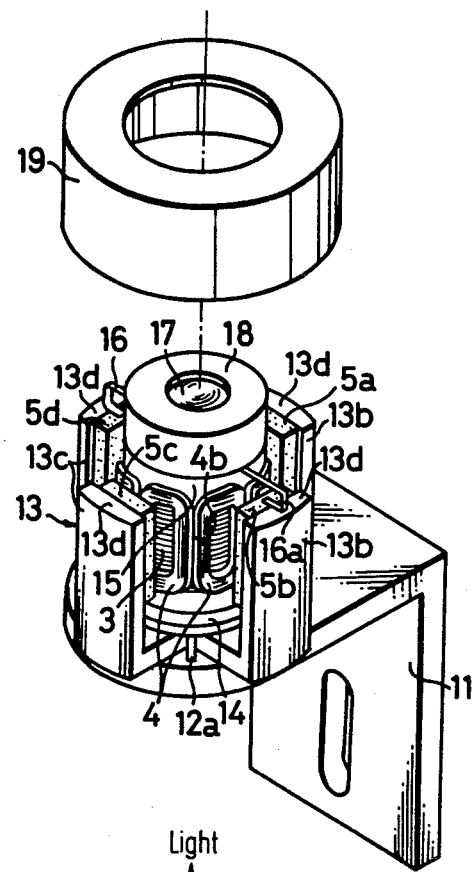
FIG. 4 is a perspective view of the pickup assembly of FIG. 3.

Next, the top end portions of the arms 16a of the leaf spring 16 are downwardly bent by 180°, and they are attached onto upper surfaces 13d of the projecting portions 13c of the yoke with adhesive. Thus, the arrangement shown in FIG. 4 is obtained. Then, the cap 19 is fitted to the projecting portions 13c of the yoke 13 to obtain the complete arrangement shown in FIG. 5.

Figure 6:
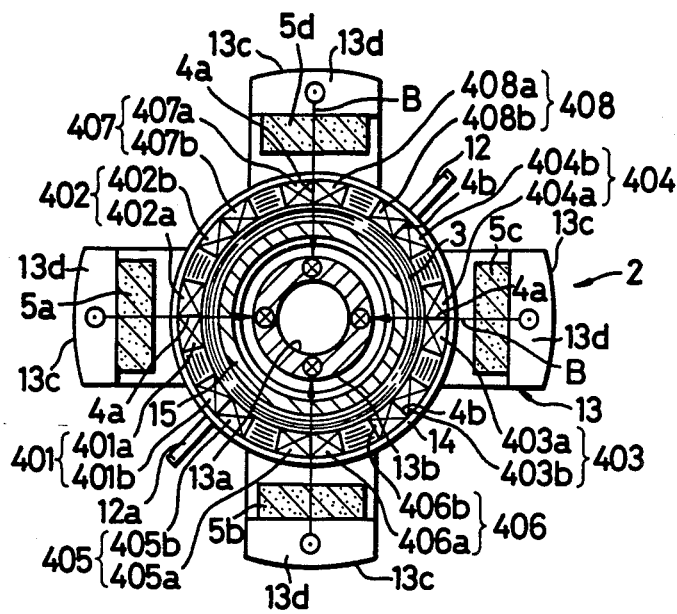
FIG. 6 is a cross-sectional view taken along the line VI—VI of FIG. 5.

In FIG. 5, the movable member 2 is constituted by the bobbin 15, the ring 14, and the holder 18. Since the movable member 2 is supported by the bent top end portions of the leaf springs 12 and 16, it can be moved in the three ways. As shown in FIG. 6, there are the eight adjoining portions of the eight coils 4. The four 4a of the eight adjoining portions face to the permanent magnets 5, respectively. The other four 4b thereof are deviated from the magnetic paths of the magnets 5.

Next, there will be the arrangement of the coils 4 in more detail.

Two coils 401 and 402 for driving the movable member 2 in the X-axis direction face to the magnet 5a. The adjoining portions 4a of the coils 401 and 402 align with the center of magnetic flux flowing from the magnet 5a. One side portions 401a and 402a of the coils 401 and 402 receive effectively magnetic flux from the magnet 5a. Other side portions 401b and 402b of the coils 401 and 402 are deviated from the effective magnetic field of the magnet 5a. Similarly, two coils 403 and 404 face to the magnet 5c which is arranged diametrically to the magnet 5a. One side portions 403a and 404a of the coils 403 and 404 receive effectively magnetic flux flowing from the magnet 5c. Other side portions 403b and 404b of the coils 403 and 404 are deviated from the effective magnetic field of the magnet 5c. In other words, the adjoining portions 4a of the coils 403 and 404 almost align with the center of the magnet 5c.

Two coils 405 and 406 for driving the movable member 2 in the Y-axis direction face to the magnet 5b. The adjoining portions 4b of the coils 405 and 406 align with the center of the magnetic flux flowing from the magnet 5b. One side portions 405a and 406a of the coils 405 and 406 receive effectively the magnetic flux from the magnet 5b. Other side portions 405b and 406b of the coils 405 and 406 are deviated from the effective magnetic field of the magnet 5b. Similarly one side portions 407a and 408a of two coils 407 and 408 facing to the magnet 5d receive effectively the magnetic flux flowing from the magnet 5d. Other side portions 407b and 408b of the coils 407 and 408 are deviated from the effective magnetic flux of the magnet 5d. The adjoining portions 4a of the coils 407 and 408 almost align with the center of the magnet 5d.

When currents are flowed through the coils 401 and 402, and 403 and 404, in the directions shown in FIG. 2, magnetic fluxes $B_1$ and $B_3$ are generated to drive the bobbin 15 in the +Y direction, namely downwards in FIG. 2. When currents are flowed through the coils 405 and 406, and 407 and 408 in the directions shown in FIG. 2, magnetic fluxes $B_2$ and $B_4$ are generated to drive the bobbin 15 in the +X direction, namely rightwards in FIG. 2. And when current is flowed through the coil 3 wound on the bobbin 15, the latter is driven in the Z-direction, namely in the direction normal to the surface of the drawing of FIG. 2. Thus, the movable member 2 is driven in the X-, Y- and Z-axis directions to correct the tracking error, time base error and focus error.

As above described, the coils for driving the movable member 2 in the X- and Y directions (for example, 401 and 404) are arranged symmetrically to each other with respect to the axis of the bobbin 15. Accordingly, the mass distribution of the movable member 2 balances with respect to the bobbin 15. When the movable member 2 is driven in the X- or Y direction, undesired motion does not occur, and it is smoothly moved in the X- or Y direction. Further, since the return path of the current flowing through the coil is deviated from the effective magnetic field, it has no bad influence on the driving force.

Figure 7:
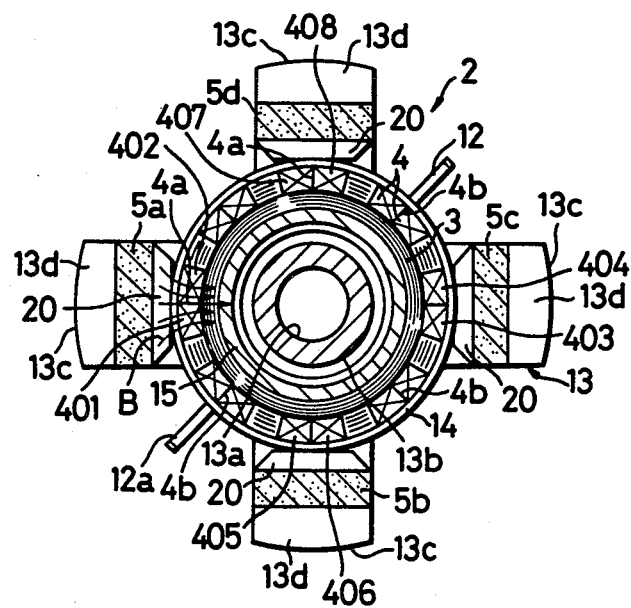
FIG. 7 is a cross-sectional view of a pickup assembly for a disc player, similar to FIG. 6, in which a magnetic circuit is improved.
Figure 8:
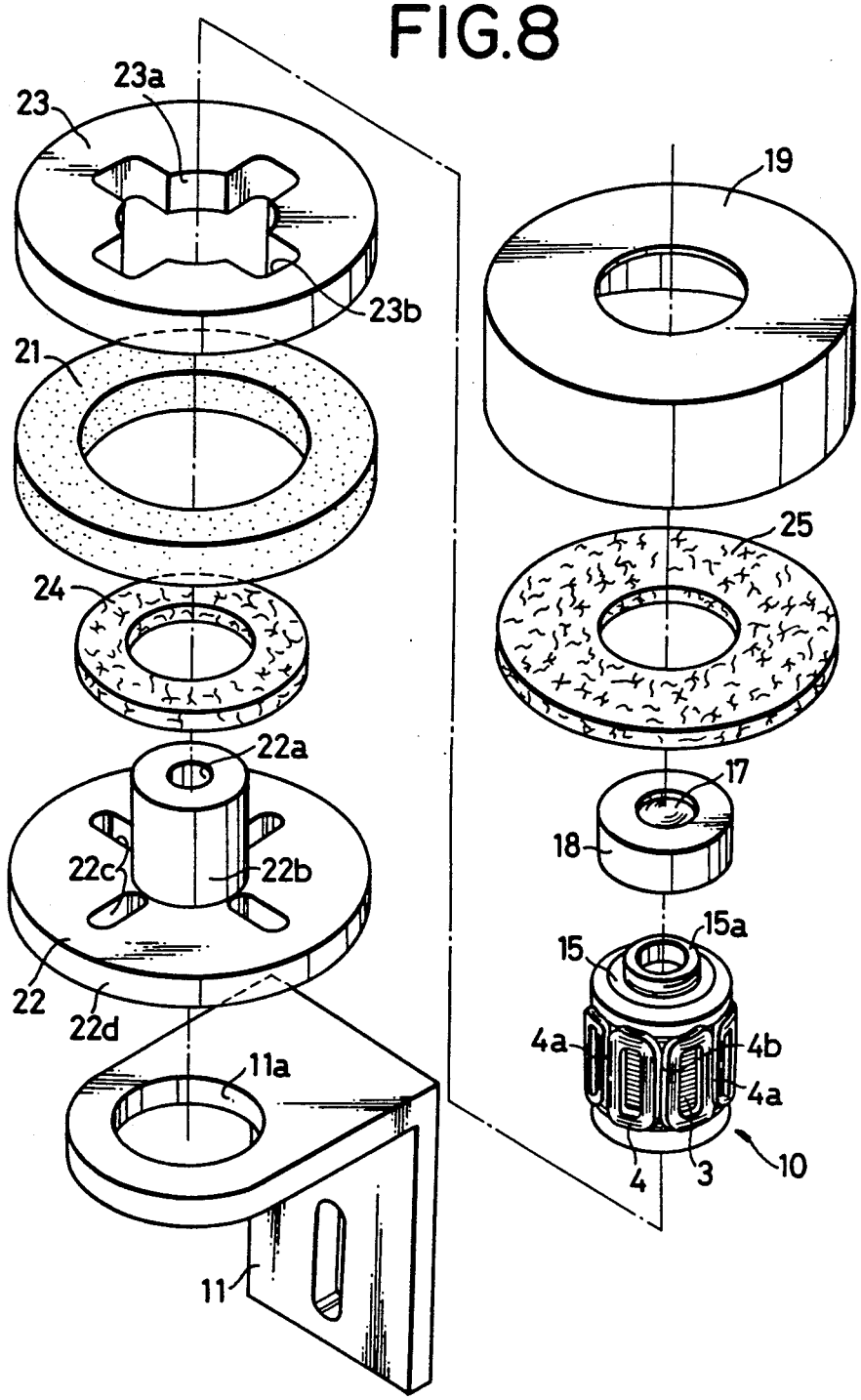
FIG. 8 is an exploded perspective view of a pickup assembly for a disc player according to a third embodiment of this invention.

FIG. 7 shows a second embodiment of this invention.

In the first embodiment, the drive force to the movable member 2 in the three ways should be so large as to sufficiently eliminate the errors in the three ways. It increases with the enlargement of the magnet. However, when the magnet is widened, the magnetic flux passes through the adjoining portions 4b of the coils 4, and undesired force is applied to the movable member 2 by the current flowing through the adjoining portions 4b.

The above described problem is solved by the second embodiment. Parts in this embodiment which correspond to those in FIG. 3 to FIG. 6, are donoted by the same reference numerals, the detailed description of which will be omitted.

As shown in FIG. 7, magnets 5a to 5d wider than those in FIG. 6 are attached to the projecting portions 13c of the yoke 13 with adhesive. Further, auxiliary yoke members 20, which are tapered towards the adjoining portions 4a of the coils 401 to 408, are attached to the magnets 5a to 5d, respectively.

Although the magnets are large, the width of the magnetic flux B is reduced, as shown in FIG. 7, by the auxiliary yoke member 20, and so the magnetic flux B does not act on the ajoining portions 4b of the coils. Thus, the large drive force can be obtained by the large magnet.

FIG. 8 to FIG. 11 show a third embodiment of this invention. Parts in this embodiment which correspond to those in FIG. 3 to FIG. 7, are denoted by the same reference numerals.

Although the magnets 5a to 5d in the first and second embodiments are plate-like, a ringular magnet 21 is used in this embodiment. Two yokes 22 and 23, and ringular damper members 24 and 25, are provided for the ringular magnet 21.

A cylindrical portion 22b having a through hole 22a is made in the one yoke 22. A disc portion 22d is formed integrally with the cylindrical portion 22b. Four elliptic through holes 22c are made at the angular intervals of 90° in the disc portion 22d. The other yoke 23 is generally disc-like. A round hole 23a is made in the other yoke 23. Four through rectangular holes 23b are made at the angular intervals of 90°, contiguous to the round hole 23a in the other yoke 23. The damper members 24 and 25 are made of uninform elastic material such as rubber or foaming urethane which has almost uninform elasticity in all directions.

The above-described parts are assembled in the following manner.

First, the one yoke 22 is fixed on the base 11. The magnet ring 21 is fixed on the yoke 22. Then, the damper member 24 is fitted into the magnet ring 21. The other yoke 23 is so fixed on the magnet ring 21 that the though holes 22c of the yoke 22 face to the rectangular holes 23b of the yoke 23.

Figure 9:
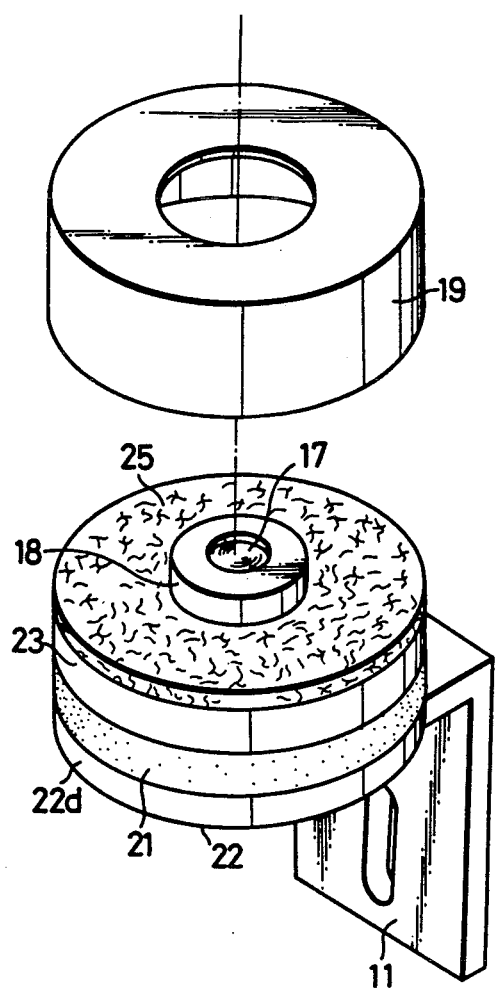
FIG. 9 is a perspective view of the pickup assembly of FIG. 8.

Next, the lower end portion of the bobbin 15 is fitted into the damper member 24. The cylindrical portion 22b of the yoke 22 is loosely fitted into the bottin 15. Then, the lens holder 18 is screwed to the small diameter portion 15a of the bobbin 15, and the damper member 25 is fitted to the lens holder 18. Thus, the arrangement shown in FIG. 9 is obtained. The cap 19 is fitted to the yoke 23 to obtain the complete arrangement shown in FIG. 10. Alternatively, after the damper member 25 is fitted into the cap 19, the cap 19 may be fitted to the yoke 23. In that condition, the small diameter portion 15a of the bobbin 15 is inserted into the damper member 25. As shown in FIG. 11, the adjoining portions 4a of the coils 401 to 408 receive effectively the magnetic field from the magnet 21, while the other adjoining portions 4b of the coils 401 to 408 are deviated from the effective magnetic field due to the elleptic holes 22c and rectangular holes 23b. Thus, the movable member 2 constituted by the bobbin 15 and the lens holder 18 can be moved in the three ways in accordance with the principle of FIG. 2.

Figure 10:
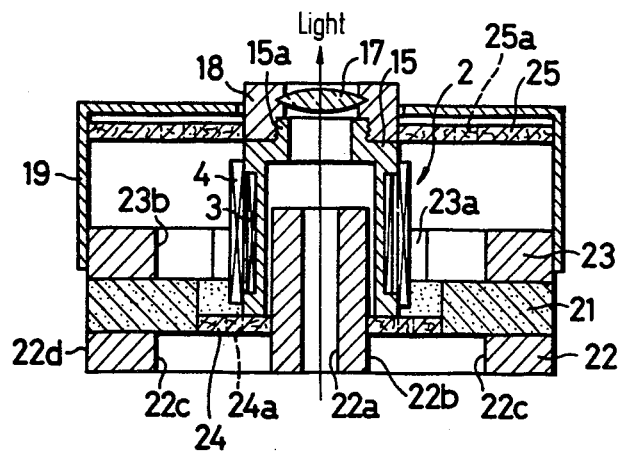
FIG. 10 is an enlarged cross-sectional side view of the pickup assembly of FIG. 8 and FIG. 9.
Figure 11:
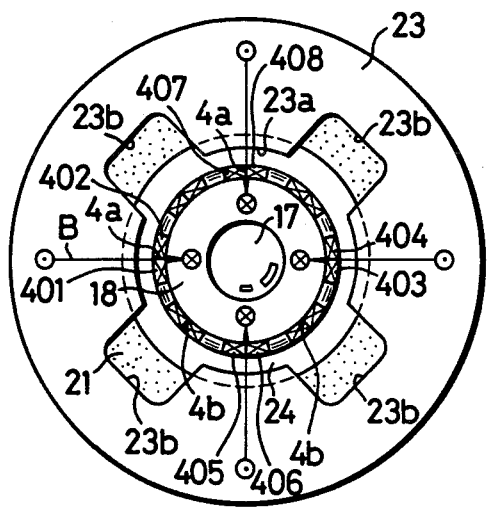
FIG. 11 is a plan view of the pickup assembly of FIG. 10 in which a cap and a damper member are eliminated from FIG. 10.

As shown by dotted lines in FIG. 10, plural openings 24a and 24b may be made in the damper members 24 and 25. In this case, when the bobbin 15 is moved up and down, air flows through the openings 24a and 25b, and so the movable member 2 can be braked by air.

In the above-described embodiments, the movable member is so supported as to be movable in the three ways, by the springs. It has a proper resonant frequency which is determined by its weight and the spring constant of the supporting springs. The vibration becomes the maximum at the resonant frequency. It has bad influence on the control of the pickup. Hitherto, a damping element is arranged for suppressing the resonant phenomenon between the movable part and the stationary part. However, the resonant phenomenon cannot be sufficiently suppressed by the damping element. Further, it takes much labor to mount the damping element.

Figure 12:
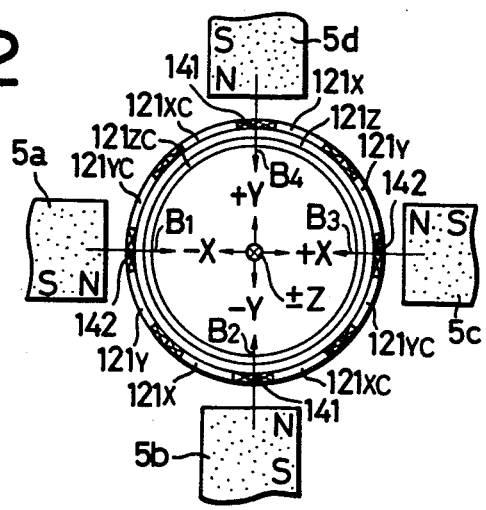
FIG. 12 is a schematic plan view of a magnetic circuit portion of a pickup assembly according to a fourth embodiment of this invention.

FIG. 12 shows the principle of a pickup assembly to remove the above-described defects.

In FIG. 12, a focus error correcting coil 121Z is arranged for moving the movably member in the Z-axis direction, namely in the direction normal to the surface of the drawing. A speed detecting coil 121ZC for the Z-axis direction is arranged coaxially with the focus error correcting coil 121Z. Further, a pair of tracking error correcting coils 121X, a pair of X-direction speed detecting coils 121XC, a pair of Y-direction speed detecting coils 121YC and a pair of time base correcting coils 121Y are arranged in the direction perpendicular to the coils 121Z and 121ZC.

The movable member includes the above described coils. The four magnets 5a to 5d are arranged arround the movable member, at the angular intervals of 90°. One adjoining portions 141 of the coils 121X and 121XC almost align with the centers of the magnets 5b and 5d. Similarly, one adjoining portions 142 of the coils 121Y and 121YC almost align with the centers of the magnets 5a and 5c. One of the coils 121X, 121XC, 121Y and 121YC is arranged symmetrically to the other thereof with respect to the axis of the bobbin.

When currents are flowed through the coils 121X, 121Y and 121Z, generated magnetic fluxes $B_1$ to $B_4$ interlock with the current flowing through the coil 121Z. A driving force in the Z-axis direction is applied to the coil 121Z. Magnetic fluxes $B_2$ and $B_4$ interlink with the current flowing through the coil 121X. A driving force in the X-direction is applied to the coil 121X. Magnetic fluxes $B_1$ and $B_3$ interlink with the current flowing through the coil 121Y. A driving force in the Y-axis direction is applied to the coil 121Y. Thus, the movable member can be moved in the three ways. When the movable member is moved in the X-axis direction, a voltage is induced in the coil 121XC in response to the X-direction speed. Similarly, when the movable member is moved in the Y-axis direction and Z-axis direction, voltages are induced in the coils 121YC and 121ZC, respectively. The induced voltages are detected to servo-control the movable member for suppressing the resonant phenomenon.

Figure 13:
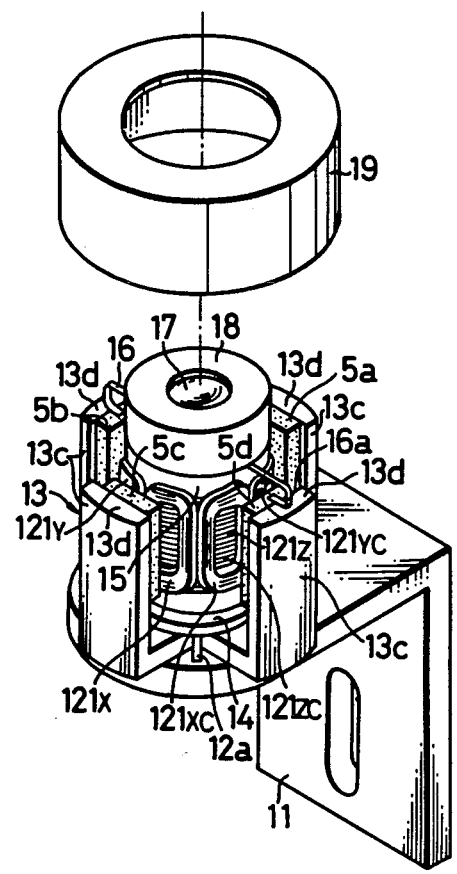
FIG. 13 is a perspective concreate view of the pickup assembly of FIG. 12.

FIG. 13 is an exploded perspective view of the pickup assembly of FIG. 12 for explaining the assembling thereof. Parts in FIG. 13 which correspond to those in the first embodiment, are donoted by the same reference numerals, the description of which will be omitted.

Next, an example of a servo circuit including the speed detecting coils 121XC, 121YC and 121ZC for correcting the errors will be described with reference to FIG. 14.

Figure 14:
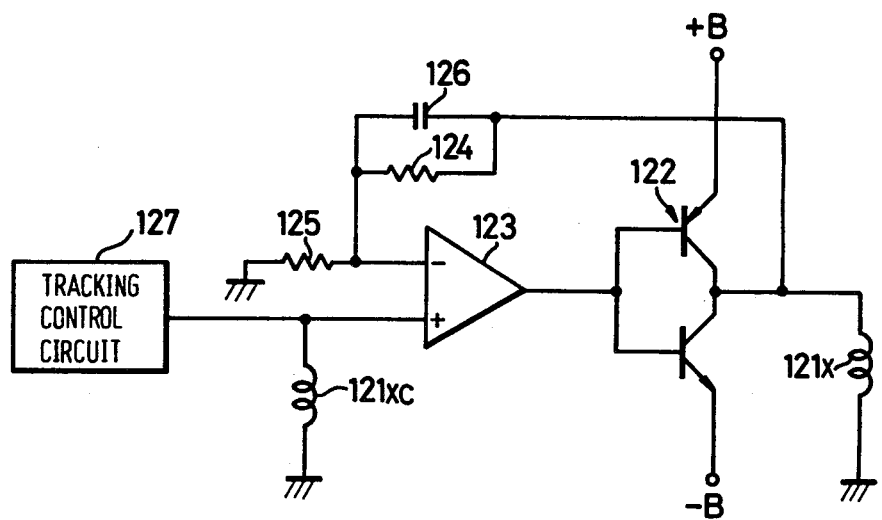
FIG. 14 is a circuit diagram of a tracking servo control of the pickup assembly of FIG. 13.
Figure 15:
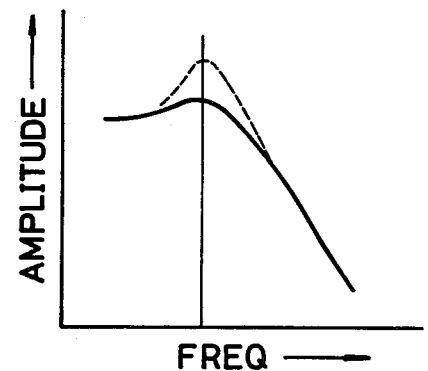
FIG. 15 is a graph showing the relationship between the amplitude of the movable member of the pickup assembly of FIG. 13, and the driving frequency.

FIG. 14 shows an example of a tracking servo circuit. In FIG. 14, the X-axis drive coil 121X is driven by a drive current obtained from a drive circuit 122. The drive circuit 122 is controlled by output of a servo amplifier 123 which is constituted by a differential amplifier. A part of the output of the drive circuit 122 is fed back through resistors 124 and 125, and a capacitor 126 to a minus terminal of the servo amplifier 123. A loop gain and a response characteristic are determined by the resistors 124 and 125, and the capacitor 126. A tracking error correcting signal from a tracking control circuit 127 and a detecting voltage from the speed detecting coil 121XC are supplied to a plus terminal of the servo amplifier 123. Thus, a control signal for suppressing the vibration of the coils 121X and 121XC, or of the movable member, and correcting the tracking error is obtained from the servo amplifier 123. The resonant phenomenon of the movable member is suppressed by the servo circuit of FIG. 14, as shown by the dotted line and solid line in FIG. 15.

Although the circuit of FIG. 14 is applied to the tracking servo control, the same circuit as that of FIG. 14 may be provided for the time base servo control and the focus servo control. The phenomenon of the movable member is suppressed by these servo control circuits.

As above described, the coil is provided for detecting the vibration of the movable member. The detecting voltage of the coil is fed back to suppress the vibration of the movable member. Only the detecting coil is added to the conventional servo circuit to suppress the resonant phenomenon of the movable member.

Further, as above described, the total weight of the eight coils and bobbin 15 balances by the arrangements of the eight coils shown in FIG. 2, 6, 7, 11 or 13. The leaf springs 12 and 16 in the first and second embodiments may be substituted with the damper members 24 and 25 in the third embodiment. Alternatively, the damper members 24 and 25 in the third embodiment may be substituted with the leaf springs 12 and 16 in the first and second embodiments.

According to this invention, the coils are arranged on the movable member including the bobbin, within the magnetic path, and the movements of the entire movable member can be controlled in the three ways, respectively. The pickup assembly is simple in construction. The control is easy. The errors in the three directions can be easily eliminated. Further, the resonant vibration of the movable member is suppressed with the arrangement of the feedback coil.

What is claimed is:

1. A pickup assembly for a disc player comprising:
   (A) a tube-like movable member having an optical system;

(B) a first coil group wound on said movable member in the direction parallel to the axis of said movable member;
(C) second and third coil groups arranged on said movable member, perpendicular to said first coil group in the space relationship of angle 90° to each other, said second and third coil groups each including a pair of adjoining coils, respectively; and
(D) a magnetic circuit for supplying magnetic fluxes to said first, second and third coil groups, said magnetic circuit including magnetic poles being arranged in the space relationship of angle 90° to each other so as to face to said second and third coil groups respectively, and said movable member being axially and radially supported by spring means to align and bias the adjoining side portions of said paired coils of the second and third coil groups substantially with and toward the center of said magnetic poles respectively.

2. A pickup assembly for a disc player according to claim 1, in which said second coil group is symmetrically arranged with respect to the axis of said movable member, and said third coil group is symmetrically arranged in the space relationship of angle 90° to said second coil group with respect to the axis of said movable member.

3. A pickup assembly for a disc player according to claim 1, in which said magnetic circuit includes a first hollow yoke arranged within said movable member and a second yoke having permanent magnets, said second yoke being magnetically integral with said first yoke and said permanent magnets facing to said first, second and third coil group, and said spring means is arranged between said magnetic circuit and said movable member.

4. A pickup assembly for a disc player according to claim 3, in which said spring means includes a first leaf spring having plural arms, arranged between one end of said movable member and said magnetic circuit, and a second leaf spring having plural arms, arranged between another end of said movable member and said magnetic circuit, said arms of the first leaf spring being angularly shifted from said arms of the second leaf spring.

5. A pickup assembly for a disc player according to claim 3, in which said second yoke includes four magnetic pole members formed integrally with said first yoke and in the axis direction of said movable member, said permanent magnets being attached to said magnetic pole elements, respectively.

6. A pickup assembly for a disc player according to claim 5, in which auxiliary tapered yokes are attached to the surfaces of said permanent magnets, respectively.

7. A pickup assembly for a disc player according to claim 1, in which said spring means comprises a foaming urethane arranged between said movable member and said magnetic circuit.

8. A pickup assembly for a disc player according to claim 1, in which said magnetic circuit includes a first yoke having a central hollow, a ringular permanent magnet coupled magnetically with said first yoke, and a second yoke having magnetic pole elements which face to said first, second and third coil groups.

9. A pickup assembly for a disc player according to claim 1, in which said first coil group includes a first coil part for driving said movable member in its axis direction, a second coil part for detecting the axial movement of said movable member, and generating detecting output, and means for feeding back said detecting output of the second coil part to said first coil part to prevent any undesirable movement of said movable member.

10. A pickup assembly for a disc player according to claim 1, in which a current flowing through one of said paired coils of the second coil group functions to drive said movable member in the first direction normal to the axis of said movable member, and the other of said paired coils of the second coil generates an electrical signal in response to the movement of said movable member in said first direction, said electrical signal being supplied to prevent the undesirable movement of said movable member in said first direction.

11. A pickup assembly for a disc player according to claim 1, in which a current flowing through one of said paired coils of the third coil group functions to drive said movable member in the second direction normal to the axis of said movable member, and the other of said paired coils of the third coil generates an electrical signal in response to the movement of said movable member in said second direction, said electrical signal being supplied to prevent the undesirable movement of said movable member in said second direction.

* * * * *